United States Patent [19]
Fake

[11] 3,853,899
[45] Dec. 10, 1974

[54] 7-ALKYL-2,2-DIMETHYL-4-(1-ARALKYL-1,2,3,4-TETRAHYDRO-4-PYRIDYL)-CHROMAN-5-OLS AND DERIVATIVES THEREOF

[75] Inventor: Charles Sylvester Fake, Harlow, England

[73] Assignee: Beecham Group Limited, Middlesex, England

[22] Filed: Jan. 16, 1973

[21] Appl. No.: 324,222

[30] Foreign Application Priority Data
Jan. 26, 1972 Great Britain..................... 3654/72

[52] U.S. Cl........... 260/297 B, 260/295 F, 424/263, 424/266
[51] Int. Cl............................................. C07d 31/28
[58] Field of Search..................... 260/295 F, 297 B

[56] References Cited
UNITED STATES PATENTS
3,707,474  12/1972  Razdan et al.................... 260/295 F
3,726,883  4/1973   Razdan et al. ................... 260/297 B OTHER PUBLICATIONS
Burger Medicinal Chemistry, Second Edition, Interscience Pub., Page 497, RS 403 B8 1960 C.7.

Karrer, Organic Chemistry, 4th English Edition, Page 928, Elsevier Pub. Co. (N.Y.) 1950.

Primary Examiner—Alan L. Rotman

[57] ABSTRACT

Chromanols of the formula (II)

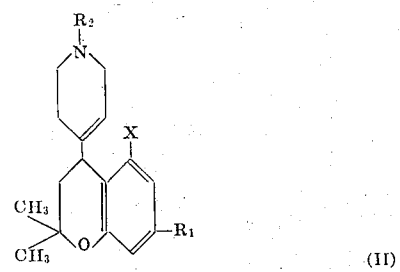

(II)

wherein $R_1$ is a non-aromatic hydrocarbon group of 1–20 carbon atoms, $R_2$ is a hydrocarbon group of 1–20 carbon atoms optionally substituted by a halogen atom and X is an optionally salted, etherified or acylated hydroxyl group, and N-oxides, acid-addition and quaternary salts thereof are shown to have antihypertensive activity. Their preparation and compositions containing them are described.

8 Claims, No Drawings

7-ALKYL-2,2-DIMETHYL-4-(1-ARALKYL-1,2,3,4-TETRAHYDRO-4-PYRIDYL)-CHROMAN-5-OLS AND DERIVATIVES THEREOF

This invention relates to novel chromanols having a tetrahydropyridyl group in the 4-position, to processes for their preparation and to pharmaceutical compositions containing them. Compounds within the scope of the present invention have useful cardiovascular and central nervous system (CNS) activity, such as, for example, antihypertensive activity.

It is known that certain chromanols of general formula (I)

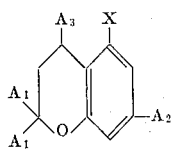

(I)

wherein $A_1$ is a hydrocarbon group of 1–6 carbon atoms, $A_2$ is a hydrocarbon group of 1–20 carbon atoms, $A_3$ is an optionally substituted aromatic or heteroaromatic group and X is a hydroxyl group optionally salted, acylated or etherified.

Certain compounds of general formula (I) have been shown to possess CNS activity. It has now been found that related compounds in which $A_3$ is a tetrahydropyridyl group have antihypertensive activity.

Accordingly the present invention provides chromanols of general formula (II):

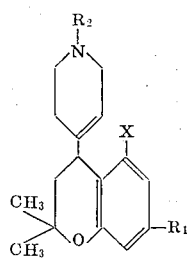

(II)

wherein $R_1$ is a non-aromatic hydrocarbon group of 1–20 carbon atoms, $R_2$ is a hydrocarbon group of 1–20 carbon atoms optionally substituted by a halogen atom and X is an optionally salted, etherified or acylated hydroxyl group; and N-oxides, acid-addition and quaternary salts thereof.

Suitable groups $R_1$ include straight or branched aliphatic groups such as the methyl, amyl, hexyl, heptyl, 2-hexyl, 2-heptyl, 2-octyl, 2-methyl-2-hexyl, 3-methyl-2-octyl, dodecyl and like groups.

Suitable groups $R_2$ include groups such as the methyl, 2-chloroethyl, 1-naphthylmethyl, 2-naphthylmethyl, benzyl and 2-phenyl ethyl.

Suitable groups X include the hydroxyl group optionally salted by an alkali metal ions such as the sodium or potassium ion or optionally acylated by groups such as the acetyl or β-diethylaminopropionyl groups or optionally etherified by optionally substituted hydrocarbon groups such as the methyl or α-dimethyl-amino propyl group.

A preferred group of compounds with general formula (II) are those of general formula (III):

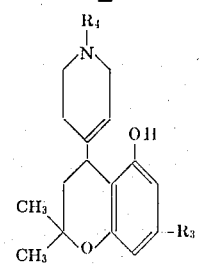

(III)

wherein $R_3$ is an alkyl group of 4–10 carbon atoms and $R_4$ is a hydrocarbon group of 7–12 carbon atoms, and salts thereof.

Preferred groups $R_3$ include the n-amyl, n-hexyl, 2-hexyl, 2-heptyl, 2-octyl, 2-methyl-2-hexyl and 3-methyl-2-octyl groups.

Preferred groups $R_4$ include the 2-propenyl, 2-phenylethyl, benzyl, 1-naphthylmethyl and 2-naphthylmethyl groups.

Compounds of the formula: (IV):

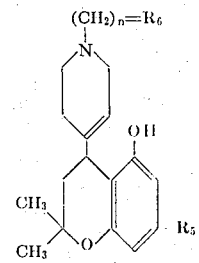

(IV)

wherein $R_5$ is a $C_5$-$C_8$ alkyl group which is straight chained or branched at the α-carbon atom, n is 1 or 2 and $R_6$ is phenyl or naphthyl, and salts thereof, are especially preferred as it is believed that such compounds combine useful anti-hypertensive activity with low mamalian toxicity.

In a second aspect the invention provides a process for the preparation of compounds of formula (II), said process comprising the reduction of a compound of formula (V):

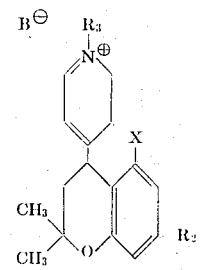

(V)

(wherein $B^-$ represents an anion) with a borohydride and thereafter if desired replacing $R_3$ and/or X in known manner.

Generally X is a hydroxyl or salted hydroxyl group in compounds of formula (V). If the desired group X is an estherified or acylated hydroxyl group, this may be prepared by standard procedures after the reduction reaction has taken place.

Suitably the borohydride is an alkali metal borohydride, preferably $NaBH_4$.

The reaction generally takes place in a solvent such as an alcohol or aqueous alcohol, for example, aqueous ethanol or the like.

Any non-extreme temperatures may be used, the reaction time being shorter when higher temperatures are employed. Preferably the temperature is between 0° and 100°C, most preferably at room temperature.

Intermediates of formula (IV) are also novel and are included within the scope of the invention.

Certain chroman-5-ols may be subject to aerial oxidation when in solution. As a result it is often advantageous to prepare and isolate the compounds of the invention under an atomsphere of nitrogen.

Compounds (V) may be made by the quaternisation of the corresponding 4-pyridyl compound, for example, by reaction with an alkyl benzyl bromide, naphthylmethylbromide allyl chloride or the like.

In a further aspect, the invention provides a pharmaceutical composition useful in treating hypertension said composition comprising a compound of formula (II) together with one or more pharmaceutical carriers. Such compositions may, if required, contain other antihypertensive agents and/or diuretics and may, if required, be made up in unit dosage forms.

Generally from 1–50 mg/kg/day of a compound of formula (II) may be administered.

The following Examples serve to illustrate the invention.

EXAMPLE 1

7-(N-Amyl)-4-(1-benzyl-1, 2,5,6-tetrahydro-4-pyridyl)-2,2-dimethyl-chroman-5-ol 7-n-Amyl-2,2-dimethyl-4-(4-pyridyl)-chroman-5-ol (3.25 g., 0.01 mole) and benzyl bromide (1.88 g., 0.011 mole) were dissolved in acetone (50 ml) and the solution was refluxed for 4 hours. The solution was then concentrated to 0.5 volume and diethyl-ether was added until no further solid was precipitated. The precipitated solid (4.40 g) was filtered off and recrystallised from acetone/ethanol/ether to yield 1-benzyl-4-[7-(n-amyl)-2,2-dimethyl-5-hydroxy-chroman-4-yl]pyridinium bromide (d.24 g., 65 percent) as fawn microcrystals, m.p. 195–200°.

This quaternary salt (3.12 g) was dissolved in a mixture of ethanol (40 ml) and water (15 ml) and the solution was stirred at ambient temperature whilst an excess of sodium borohydride (0.80 g) was added portionwise over 30 minutes. The resulting suspension was stirred for a further 30 minutes at ambient temperature and water (50 ml) was then added, followed by ether (100 ml). The organic layer was separated, washed with water (30 ml), dried over magnesium sulphate, and evaporated under reduced pressure to yield an orange oil (2.50 g). This crude product was dissolved in petroleum-ether (b.p. 60°–80°C) and the solution was filtered and cooled to −78°C to give 7-(n-amyl)-4)1-benzyl-1,2,5,6-tetrahydro-4-pyridyl)-2,2-dimethyl-croman-5-ol (0.88 g., 33 percent) as colourless microcrystals, m.p. 63°–66°.

When dosed orally to groups of metacorticoid hypertensive rats at a dose of 100mg/kg, the percent fall in systolic blood pressure after 4 and 24 hours was 20 percent and 23 percent respectively [cf. 29 percent and 9 percent respectively for α-methyldopa].

EXAMPLE 2

7-(2-Hexyl)-2,2-dimethyl-4-[1-(2-phenylethyl)- 1,2,5,6-tetrahydro-4-pyridyl]chroman-5-ol.

7-(2-Hexyl)-2,2-dimethyl-4-(4-pyridyl) chroman-5-ol (5.45 g, 0.016 mole) and 2-phenylethyl bromide (3.70 g, 0.020 mole) were dissolved in acetone (120 ml) and the solution was refluxed for 4 days. The solution was then allowed to cool and the resulting precipitate was filtered, washed with acetone and dried to yield 1-(2-phenylethyl)-4-[7-(2-hexyl)-2,2-dimethyl-5-hydroxychroman-4-yl] pyridinium bromide (7.22 g, 88 percent) as colourless microcrystals, m.p. 232°–235°C.

The quaternary salt (7.00 g) was dissolved in a mixture of ethanol (180 ml) was water (45 ml) and the solution was stirred at ambient temperature whilst an excess of sodium borohydride was added portionwise over 30 minutes. The resulting suspension was stirred for further 30 minutes at ambient temperature. Sufficient water and ether were then added to cause two phases to separate. The organic layer was separated, washed with water, dried (MgSO$_4$) and evaporated under reduced pressure to give a residual gum. Crystallisation from aqueous ethanol yield 7-(2-hexyl)-2,2-dimethyl-4-[1-(2-phenylethyl)-1,2,5,6-tetrahydro-4-pyridyl] chroman-5-ol (5.20 g., 85 percent) as colourless microcrystals, m.p. 141° – 143°C.

When dosed orally to groups of metacorticoid hypertensive rats at a dose of 100 mg/kg, the percent fall in systolic blood pressure after 4 and 24 hours was 5 percent and 29 percent respectively [cf. 29 percent and 9 percent respectively for α-methyldopa].

EXAMPLES 3 – 5

Using procedures exactly analogous to those described in Examples 1 or 2 except that the reactions are carried out under nitrogen the following compounds may be prepared;

7-(n-Heptyl)-2,2-dimethyl-4-(1-benzyl-1,2,5,6-tetrahydro-4-pyridyl)-chroman-5-ol.

7-(n-Hexyl)-2,2-dimethyl-4-[1-(1-naphthylmethyl-1,2,5,6-tetrahydro-4-pyridyl)]-chroman-5-ol.

7-(2-Octyl)-2,2-dimethyl-4-[1-(2-naphthylmethyl-1,2,5,6-tetrahydro-4-pyridyl)]-chroman-5-ol.

We claim:

1. A compound of the formula:

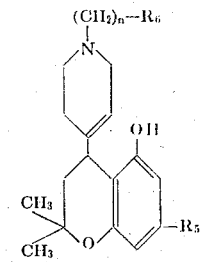

wherein $R_5$ is alkyl of 5 to 8 carbon atoms which is straight chained or branched at the α-carbon atom, $n$ is 1 or 2 and $R_6$ is phenyl or naphthyl, or a pharmaceutically acceptable salt thereof.

2. A compound of the formula

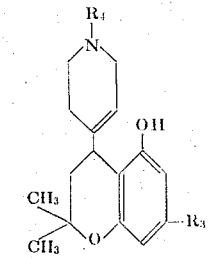

wherein $R_3$ is n-amyl, n-hexyl, 2-hexyl, n-heptyl, 2-heptyl, 2-octyl, 2-methyl-2-hexyl or 3-methyl-2-octyl, $R_4$ is 2-propenyl, 2-phenylethyl, benzyl, 1-naphthylmethyl or 2-naphthylmethyl, or a pharmaceutically acceptable non-toxic salt thereof.

3. A compound of the formula

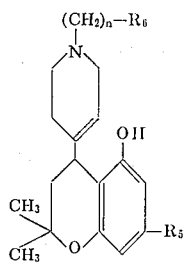

wherein $R_5$ is n-amyl, n-hexyl, 2-hexyl, n-heptyl or 2-octyl, $n$ is 1 or 2, and $R_6$ is phenyl or naphthyl, or a pharmaceutically acceptable non-toxic salt thereof.

4. The compound according to claim 1 which is 7-(n-amyl)-4-(1-benzyl-1,2,5,6-tetrahydro-4-pyridyl)-2,2-dimethylchroman-5-ol.

5. The compound according to claim 1 which is 7-(2-hexyl)-2,2-dimethyl-4-[1-(2-phenylethyl)-1,2,5,6-tetrahydro-4-pyridyl]chroman-5-ol.

6. The compound according to claim 1 which is 7-(n-heptyl)-2,2-dimethyl-4-(1-benzyl-1,2,5,6-tetrahydro-4-pyridyl)-chroman-5-ol.

7. The compound according to claim 1 which is 7-(n-hexyl)-2,2-dimethyl-4-[1-(1-naphthylmethyl-1,2,5,6-tetrahydro-4-pyridyl)]-chroman-5-ol.

8. The compound according to claim 1 which is 7-(2-octyl)-2,2-dimethyl-4-[1-(2-naphthylmethyl-1,2,5,6-tetrahydro-4-pyridyl)]-chroman-5-ol.

* * * * *

UNITED STATES PATENT OFFICE
CERTIFICATE OF CORRECTION

Patent No. 3,853,899    Dated December 10, 1974

Inventor(s) Charles Sylvester Fake

It is certified that error appears in the above-identified patent and that said Letters Patent are hereby corrected as shown below:

In column 6, Claim 8 should be deleted.

Signed and Sealed this ninth Day of September 1975

[SEAL]

Attest:

RUTH C. MASON
*Attesting Officer*

C. MARSHALL DANN
*Commissioner of Patents and Trademarks*